United States Patent

Kondo et al.

[11] Patent Number: 5,666,151
[45] Date of Patent: Sep. 9, 1997

[54] MULTIPLE AUDIO AND VIDEO SIGNAL PROVIDING APPARATUS

[75] Inventors: Yoshiyuki Kondo, Saitama; Koichi Tagawa; Tetsu Shigetomi, both of Kanagawa, all of Japan

[73] Assignee: Sony Corporation, Japan

[21] Appl. No.: 709,881

[22] Filed: Sep. 9, 1996

Related U.S. Application Data

[63] Continuation of Ser. No. 378,002, Jan. 25, 1995, Pat. No. 5,600,365.

[30] Foreign Application Priority Data

Jan. 28, 1994 [JP] Japan ................................. 6-008862

[51] Int. Cl.[6] ...................................................... H04N 7/10
[52] U.S. Cl. .............................................. 348/8; 348/385
[58] Field of Search .............................. 348/8, 10, 385, 348/387, 388, 469; 370/50; H04N 7/10

[56] References Cited

U.S. PATENT DOCUMENTS 4,704,715 11/1987 Shibagaki et al. .................. 370/50
5,216,503 6/1993 Paik et al. ........................... 348/385
5,318,450 6/1994 Carver ................................. 348/8
5,565,908 10/1996 Ahmad ............................... 348/8
5,568,484 10/1996 Margis ............................... 348/8

FOREIGN PATENT DOCUMENTS 404357727 12/1992 Japan ............................... 348/385

*Primary Examiner*—Victor R. Kostak
*Attorney, Agent, or Firm*—Ronald P. Kananen

[57] ABSTRACT

A video signal provider multiplexes digital video signals for four channels and provides a signal the bandwidth of which is limited to 6 MHz by RF-modulation. An analog video signal provider provides another signal the bandwidth of which is limited to 6 MHz by RF-modulation. A digital audio signal provider multiplexes digital audio signals for 32 channels and provides another signal the bandwidth of which is limited to 6 MHz by RF-modulation. Such signals are combined and transmitted through a coaxial cable 14 to a controller. In this example, such signal providing apparatus can provide a maximum of 84 channels (=126 MHz (the bandwidth for video signal of the coaxial cable)/6 MHz×4 ch), which number is significantly larger than the 20 channels provided in the prior art.

16 Claims, 4 Drawing Sheets

5,666,151

MULTIPLE AUDIO AND VIDEO SIGNAL PROVIDING APPARATUS

This application is a continuation of application Ser. No. 08/378,002 filed Jan. 25, 1995, now U.S. Pat. No. 5,600,365.

FIELD OF THE INVENTION

The present invention relates to an apparatus which provides an audio/visual (A/V) signal in aircraft and in particular, to an apparatus which can easily provide many channels for such A/V signal.

BACKGROUND OF THE INVENTION

In general, the signal providing apparatus currently equipped in an aircraft is an audio tuner contained in the arm of each seat with headphones connected with the tuner that allow the passenger to listen to the signal. Lately, the number of aircraft equipped with a video monitor which can provide video data, has increased. In such aircraft, it is necessary to reduce the weight and volume of equipment in order to increase the number of passengers that can be carried. The weight and the volume of the cable for transmitting data for the signal providing apparatus is relatively large because the cable is connected through controllers and receivers to all of the monitors and headphones which are equipped in each of the seats. It is accordingly useful to reduce the weight of such cable for the purpose of reducing the total weight of the equipment. In addition, a number of seats, often three for example, are formed from one box seat in the aircraft. In order to attach such box seat, a long dented rail is used and the cable for the signal apparatus lies inside the rail, for which entrance is covered with a lid from the outside. Since the cross-sectional size of the rail is relatively small, it is impossible to pass anything other than cables having small diameters through it.

For the above reason, the diameter of the cable used for the signal providing apparatus is limited in size. In addition, since the signal providing apparatus transmits an analog signal for a video image which has a bandwidth limited to 8 MHz, in other words, to one channel of a television signal, it can provide a maximum of only 20 channels. Thus, use of the signal providing apparatus is limited, as is described below. For example, the signal providing apparatus provides, at maximum, only 20 channels for pre-viewing movies for in-flight sales of video tapes. Such limited number of channels is insufficient to suit the tastes of many passengers and the in-flight sales of video tapes is not profitable. Since the number of the channels that can be delivered by the signal providing apparatus in the prior art are small, sale of in-flight videos is similarly limited. Although it is possible to transmit a baseband signal as digital data of a video image, the cost of modifying the circuits of the apparatus, in other words, of changing the transmission rate, is high when the number of channels is increased. Such signal providing apparatus would require an encoder for outputting a video image through a TV tuner or a TV camera in real time. Such an encoder is large, heavy and expensive.

SUMMARY OF THE INVENTION

It is accordingly an object of the present invention to develop an improved signal providing apparatus which can provide a number of channels and for which the number of such channels can be easily increased.

In one aspect of the present invention, a signal providing apparatus is comprised of a digital video signal outputting means, a time-division multiplexer, a digital video signal modulator, a frequency-division multiplexer, a tuner, a video signal demultiplexer, an expander, and a display. The digital video outputting means outputs a number of compressed digital video signals. The time-division multiplexer multiplexes a number of the compressed digital video signals by time-division. The digital video signal modulator modulates the output signal from the time-division multiplexer. The frequency-division multiplexer, receiving the output signal from the digital video signal modulator and another input signal, multiplexes the output signal from the modulator and the further input signal by frequency-division. The tuner, receiving the output signal from the frequency-division multiplexer, demodulates the output signal and selects a signal having a specific frequency. The video signal demultiplexer selects one of the compressed digital video signals multiplexed by time-division in the output signal from the tuner. The expander expands the output signal from the video signal demultiplexer. The display, receiving the output signal from the expander, displays a video image.

In another aspect of the present invention, the signal providing apparatus is further comprised of an analog video signal outputting means, an analog video signal modulator, and a decoder. The analog video signal outputting means outputs an analog video signal. The analog video signal modulator modulates the analog video signal and provides a modulated analog video signal as another input signal to the frequency-division multiplexer. The decoder decodes the analog video signal, included in the output signal from the tuner, into the output signal supplied to the display.

In still another aspect of the present invention, in the signal providing apparatus, the digital video modulator and the analog video signal modulator are RF-modulators which modulate signals by carrier frequencies each bandwidth of which is 6 MHz.

In still another aspect of the present invention, the signal providing apparatus is further comprised of an audio signal outputting means, an audio signal multiplexer, audio signal modulator, and an audio signal demultiplexer. The audio signal outputting means outputs a number of audio signals. The audio signal multiplexer multiplexes a number of the audio signals by time-division. The audio signal modulator modulates the output signal from the audio signal multiplexer, and provides a modulated signal as another input signal to the frequency-division multiplexer. The audio signal demultiplexer selects one of a number of the audio signals multiplexed by time-division in the output signal from the tuner.

In still another aspect of the present invention, the signal providing apparatus is further comprised of an audio signal compressor for compressing a number of the audio signals outputted from the audio signal outputting means, and an expander for expanding the output signal from the audio signal demultiplexer.

In still another aspect of the present invention, the signal providing apparatus is comprised of a digital video signal provider, and an analog video signal provider, an audio signal provider, and a frequency-division multiplexer. The digital video signal provider is comprised of a digital video signal outputting means for outputting a number of compressed digital video signals, a time-division multiplexer for multiplexing a number of the compressed digital video signals by time-division, and a digital video signal modulator for modulating the output signal from the time-division multiplexer. The analog video signal provider is comprised of an analog video signal outputting means for outputting an analog video signal, and an analog video signal modulator for modulating the analog video signal. The audio signal provider is comprised of an audio signal outputting means for outputting a number of audio signals, an audio signal time-division multiplexer for multiplexing a number of the audio signals by time-division, and an audio signal modulator for modulating the output signal from the audio signal time-division multiplexer. The frequency-division multiplexer multiplexes, by frequency-division, the output signals from the digital video signal provider, the analog video signal provider, and the audio signal provider.

In still another aspect of the present invention, the signal providing apparatus is comprised of a digital video signal provider, and an analog video signal provider, an audio signal provider, a frequency-division multiplexer, a tuner, a video signal demultiplexer, an audio signal demultiplexer, an expander, a decoder, and a display. The digital video signal provider is comprised of a digital video signal outputting means for outputting a number of compressed digital video signals, a time-division multiplexer for multiplexing a number of the compressed digital video signals by time-division, and a digital video signal modulator for modulating the output signal from the time-division multiplexer. The analog video signal provider is comprised of an analog video signal outputting means for outputting an analog video signal, and an analog video signal modulator for modulating the analog video signal. The audio signal provider is comprised of an audio signal outputting means for outputting a number of audio signals, an audio signal time-division multiplexer for multiplexing a number of the audio signals by time-division, and an audio signal modulator for modulating the output signal from the audio signal time-division multiplexer. The frequency-division multiplexer multiplexes, by frequency-division, the output signals from the digital video signal provider, the analog video signal provider, and the audio signal provider. The tuner, receiving the output signal from the frequency-division multiplexer, demodulates the output signal and selects a signal having a specific frequency. The video signal demultiplexer selects one of the compressed digital video signals multiplexed by time-division in the output signal from the tuner. The audio signal demultiplexer selects one of a number of the audio signals multiplexed by time-division in the output signal from the tuner. The expander expands the output signal from the video signal demultiplexer. The decoder decodes the analog video signal, included in the output signal from the tuner. The display, receiving the output signal from the expander, displays a video image.

Additional objects and advantages of the present invention will be apparent from the following detailed description of a preferred embodiment thereof which is best understood with reference to the accompanying drawings.

DETAILED DESCRIPTION OF THE PREFERRED EMBODIMENT

A preferred embodiment according to the present invention is described below with reference to drawings.

Figure 1:
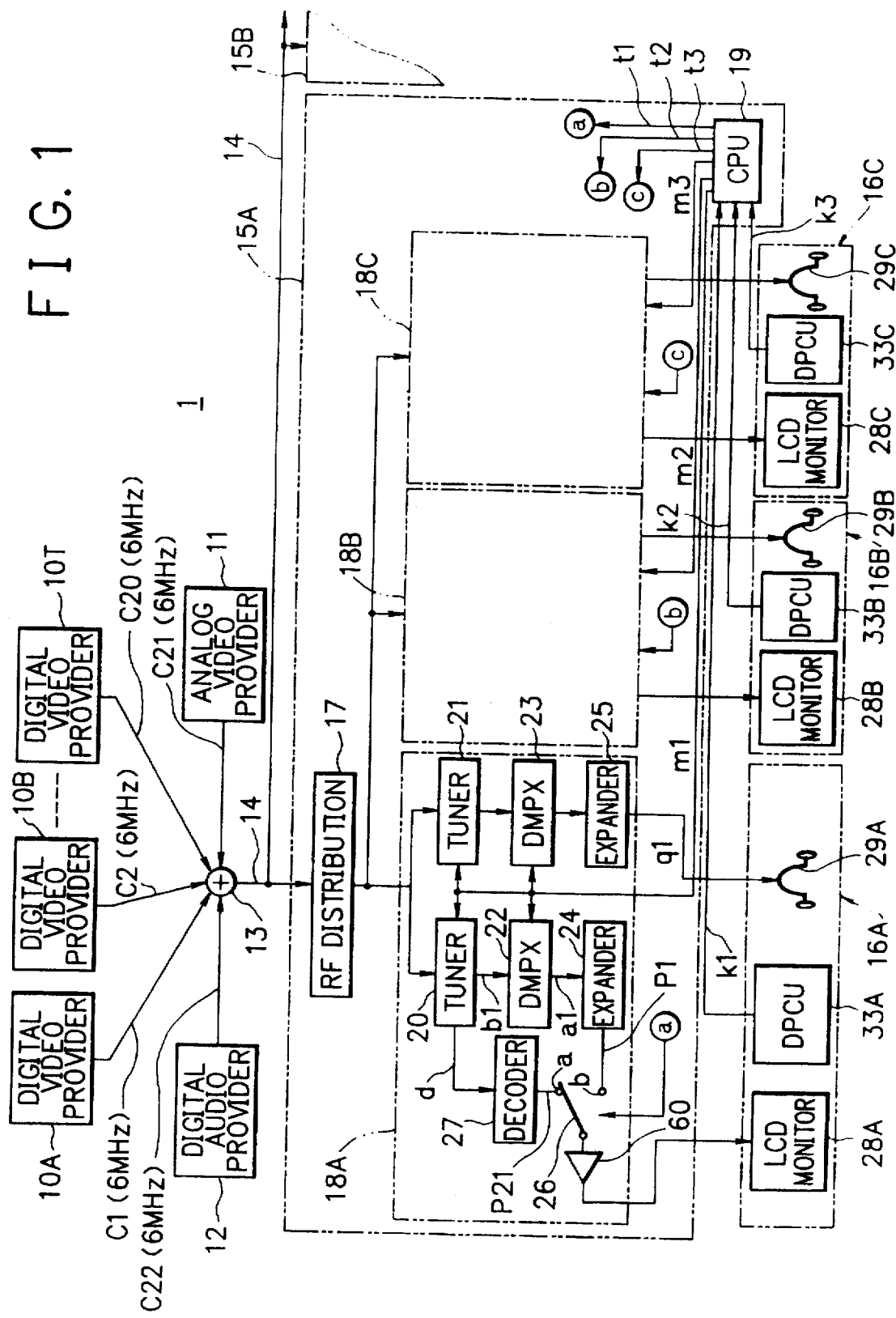
FIG. 1 illustrates, in block diagram form, an AV signal providing apparatus as a preferred embodiment in accordance with the present invention.
Figure 2:
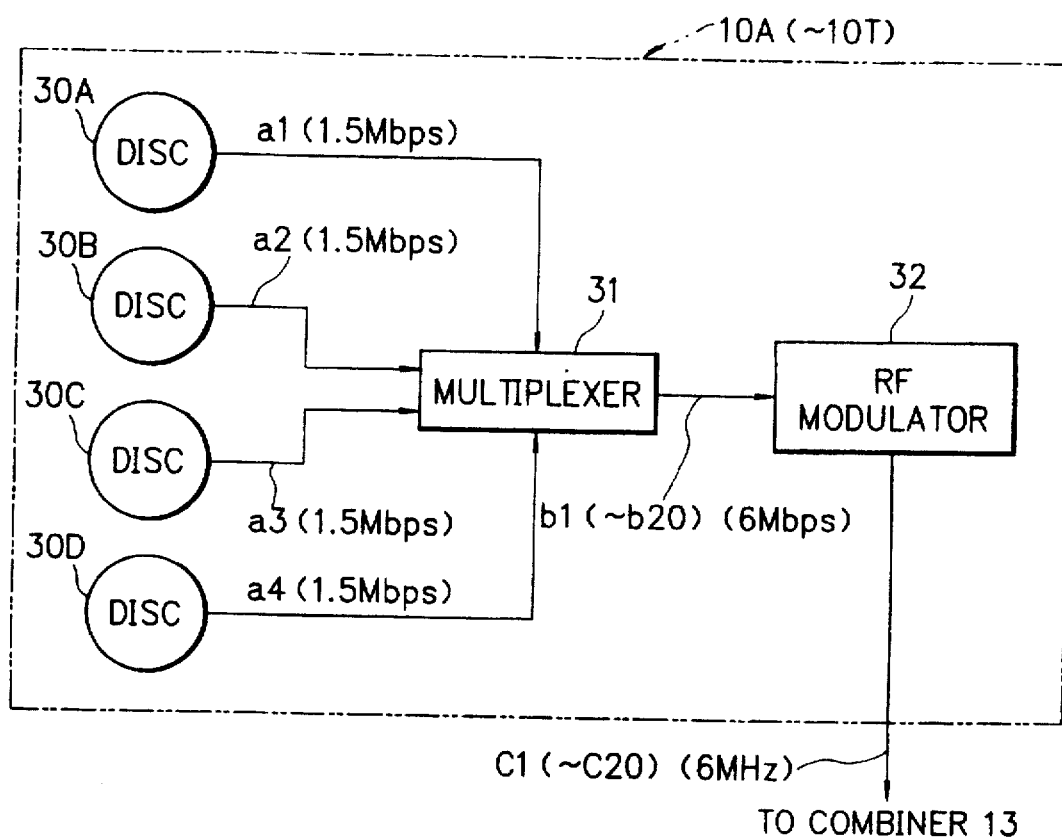
FIG. 2 illustrates, in block diagram form, digital video signal providers 10A to 10T.

FIG. 1 illustrates, in block diagram, the construction of an audio/visual (A/V) signal providing apparatus 1 in an aircraft according to the present invention. The A/V signal providing apparatus 1 has twenty, in this example, digital video signal providers 10A to 10T, an analog video signal provider 11, and a digital audio signal provider 12. As shown in FIG. 2, the digital video signal provider 10A has four discs 30A to 30D, four in this example, on which video signals a1 to a4 digitally compressed to 1.5 Mbps by MPEG are recorded. These video signals a1 to a4 are supplied to a time-division multiplexer 31, which provides a digital signal b1 of 6 Mbps, using time-division multiplexing. An RF modulator 32, receiving the digital signal b1, provides a modulated signal c1, the bandwidth of which is limited to 6 MHz. Thus, a digital video signal provider 10A provides the signal c1 which includes four channels of digital video signals a1 to a4. Similarly, other digital video signal providers 10B to 10T provide signals c2 to c20, each of which includes four channels of digital video signals a5 to a8, a9 to a12, and so on. In total, these digital video signal providers provide 80 (=20×4) channels of digital video signals. Each of the signals c1 to c20 has respective carrier frequencies f1 to f20 different from the other, the band width of which is limited to 6 MHz, equal to one channel of TV.

In the above-mentioned embodiment, four video signals are compressed into the digital video signals a1 to a4 of 1.5 Mbps, which are recorded on four discs 30A to 30D, in connection with the bandwidth limitation of the output from the RF modulator 32 to 6 MHz. If the video signal to be recorded on the disc 30A is compressed into 1.0 Mbps, the number n of channels included in the signal c1 is obtained from the equation, n=6 Mbps/1.0 Mbps=6. In this case, the digital video signal providers 10A to 10T can provide six channels of video signals, using six discs 30A to 30F, thereby providing a total of 120 (=20×6) channels of video signals. It is accordingly also possible to easily change the number of channels for the video signals by changing the compression rate for the digital video signals a1, a2, etc., which are recorded on the discs 30A, 30B and so on.

Figure 3:
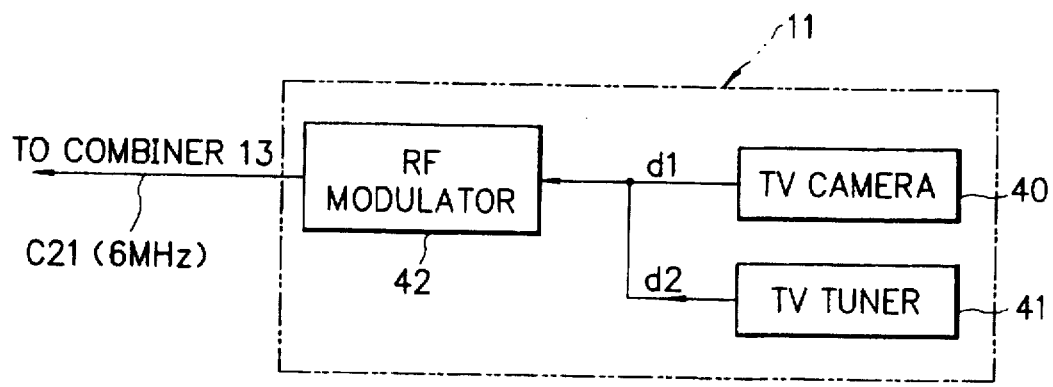
FIG. 3 illustrates, in block diagram form, an analog video signal provider 11.

The analog video signal provider 11, as shown in FIG. 3, RF-modulates analog video signals d1 and d2 supplied from a TV camera 40 and a TV tuner 41 with an RF modulator 42 and provides a modulated signal c21. The signal c21 has a carrier frequency f21, the bandwidth of which is limited to 6 MHz, in an arrangement similar to the signals c1 to c20.

Figure 4:
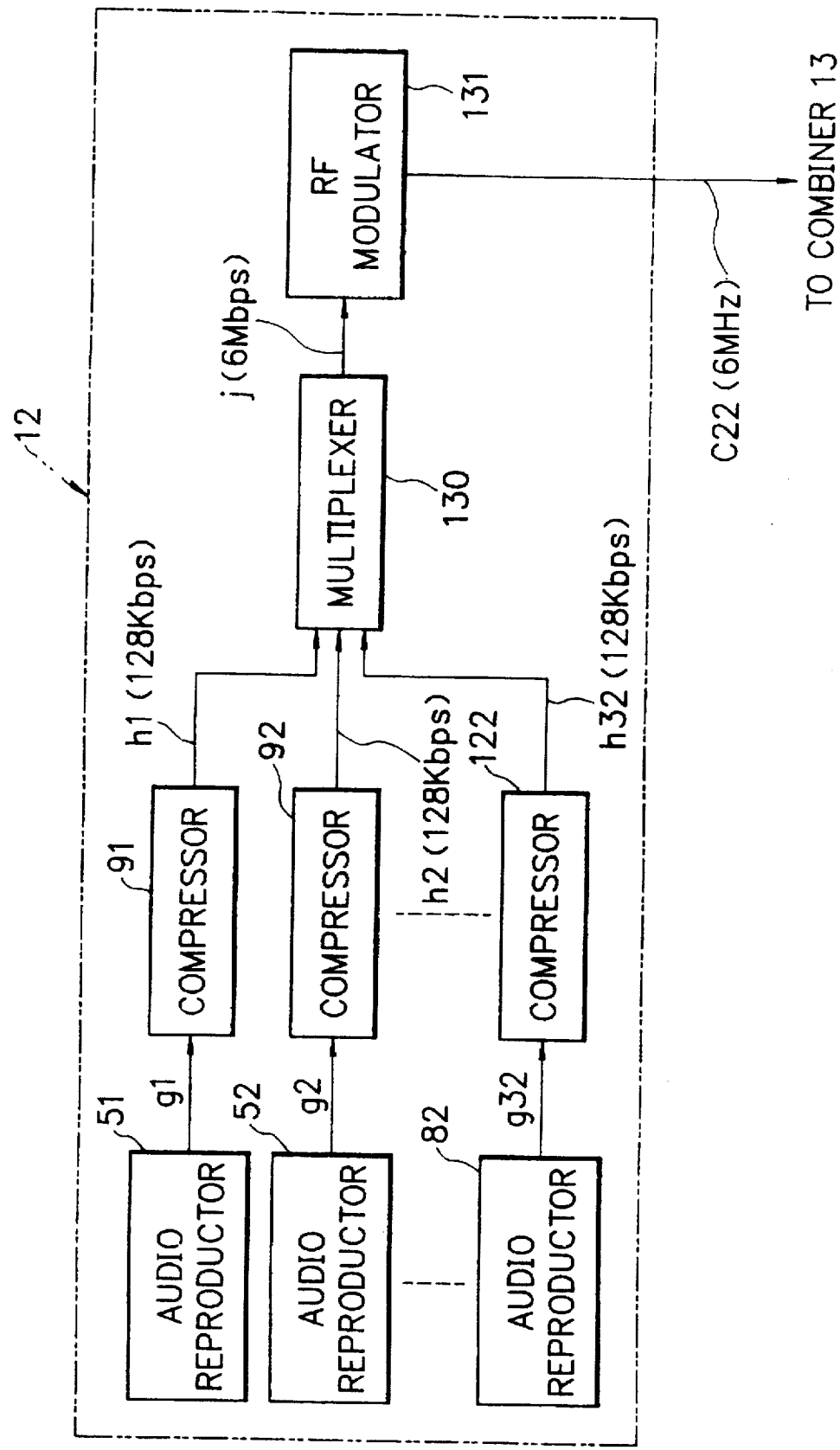
FIG. 4 illustrates, in block diagram form, a digital audio signal provider 12.

The digital audio signal provider 12, as shown in FIG. 4, has a number of 32 audio reproducers 51 to 82, in this example, such as CD players, which provide an analog audio signals g1 to g32, respectively which are compressed into digital signals h1 to h32 of 128 Kbps by compressors 91 to 122, respectively. Such signals h1 to h32 are supplied to a time-division multiplexer 130 providing a digital signal j of 6 Mbps, which is modulated into a signal c22 by an RF-modulator 131. The signal c22 has a carrier frequency f22 the bandwidth of which is limited to 6 MHz.

Figure 5:
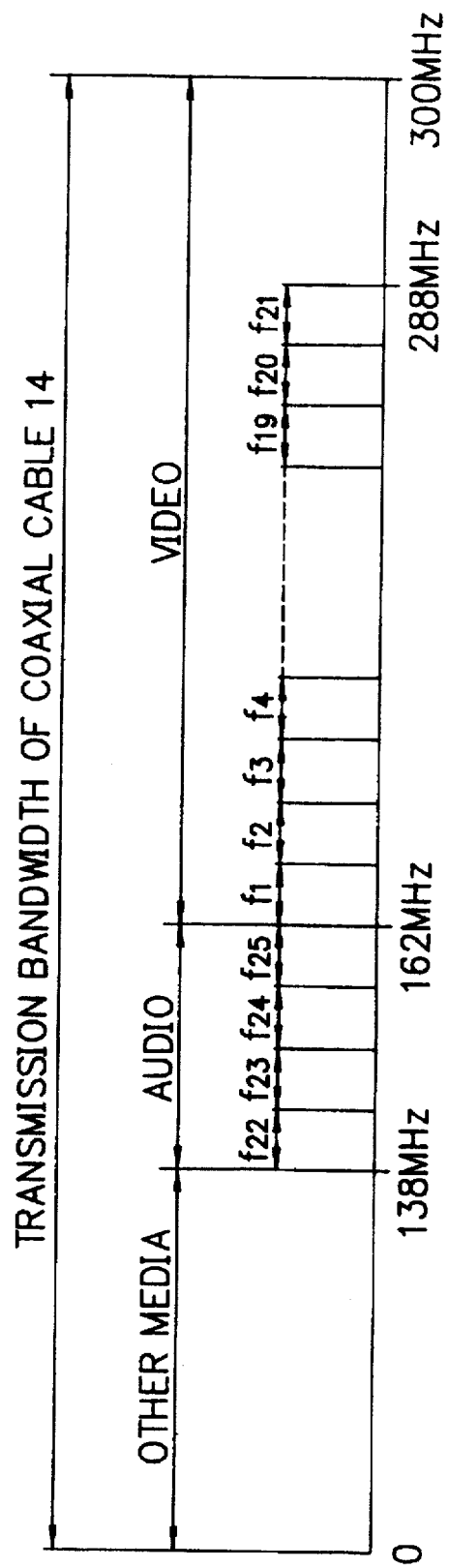
FIG. 5 illustrates a transmission bandwidth of a coaxial cable 14 and carrier frequencies f1 to f22 of signals c1 to c22.

Referring to FIG. 1, the signals c1 to c22 from the digital video signal provider 10A to 10T, the analog video signal provider 11, and the digital audio signal provider 12 are combined (frequency-division multiplexing) by a combiner 13 and transmitted through a coaxial cable 14, used as a transmission line, to a number of data controllers 15A, 15B, etc.. In other words, the signals c1 to c22, having carrier frequencies f1 to f22, respectively, the bandwidth of which are limited to 6 MHz are transmitted through the coaxial cable 14. This preferred embodiment uses the coaxial cable having a transmission bandwidth of 300 MHz, which is equal to a typical TV signal. Although it is also possible to transmit signals having frequencies of a larger bandwidth, an amplifier having a higher amplification factor is needed otherwise there will be increasing loss of quality, capacity, and so on. The transmission bandwidth in this embodiment is therefore set to 300 MHz. The signal c22, an audio signal, as shown in FIG. 5, has a carrier frequency f22 between 138 MHz and 162 MHz, while the signals c1 to c21 have carrier frequencies f1 to f21 between 162 MHz and 288 MHz. It is possible to provide a total of 128 channels of audio signal by adding three further digital audio signal providers 12 for 98 channels and using the remaining 18 MHz for audio signal. In this case, each of carrier frequencies f22 to f25 of signals c22 to c25, provided from the digital audio signal providers 12, has a bandwidth different from the others, set to 6 MHz.

Although the above embodiment has 20 digital video signal providers 10A, 10B, and so on, and one analog video signal provider 11, it is feasible to increase the number of the analog video signal providers 11 and to reduce the number of the digital video signal providers 10A, 10B, and so on, so that the total number of these signal providers remains 21.

Referring to FIG. 1, every set of seats, three seats constituting one block, are equipped with the data controllers 15A, 15B, and so on, in this example. In other words, one data controller 15A handles three seats 16A to 16C. The signals c1 to c22 from the combiner 13 are supplied through the coaxial cable 14 as an input to each of the data controllers 15A, 15B, and so on. For example, the controller 15A has a distributor 17, receivers 18A to 18C (the construction of only receiver 18A is shown) the number of which is equal to the number of seats, and a CPU 19. The controller 15A receives the signals c1 to c22, which are distributed to the receivers 18A to 18C by the distributor 17. The RF signals c1 to c22 are supplied to a video tuner 20 and an audio tuner 21 as inputs to the receivers 18A to 18C, and each of the tuners 20 and 21 demodulates the signals c1 to c22 into digital signals b1 to b20, analog video signals d1 and d2, and the digital signal j.

In a further example, the CPU 19 receives selection signals k1 to k3 for selecting one of the video or audio channels and provides control signals m1 to m3 to the tuners 20 and 21. The tuners 20 and 21 are thereby directed to output the signal fn of the selected carrier frequency among the demodulated signals b1 to b20, d1, d2, and j. In other words, when one of the video channels for a video signal is selected by the control signals m1 to m3, the video tuner 20 outputs one of the digital signals b1 to b20 and the analog video signals d1 and d2, and when one of the audio channels is selected, the audio tuner 21 outputs the digital signal j. For example, when the digital signal b1 is selected through the video tuner 20, a video demultiplexer (DMPX) 22 demultiplexes the digital video signals a1 to a4 from each other, in their original condition before being time-division multiplexed, and selects one of such demultiplexed digital video signals a1 to a4, for example, the digital signal a1, through the control of the CPU 19. A video expander 24 expands this selected digital signal a1 into a video signal p1, which is supplied to a terminal b of a switch 26. Similarly, when one of the digital signals b2 to b20 is selected through the video tuner 20, the video expander 24 provides the video signals p2 to p20 to the terminal b of the switch 26. When the video tuner 20 outputs the analog video signal d, a decoder 27 decodes the analog video signal d into the video signal p21, which is supplied to the terminal a of the switch 26. The switch 26, controlled by a switch signal t1 supplied from the CPU 19 in accordance with the selection signal k1, is switched to the terminal a or b, at which time, one of the video signals p1 to p21 is supplied through an amplifier 60 to a liquid crystal monitor 28A which displays the video image for the selected channel.

In still a further example, the digital signal j is supplied from the audio tuner 21 to an audio demultiplexer (DMPX) 23, which demultiplexes the digital audio signals h1 to h32 from each other in their original condition before being time-division multiplexed. When one of these digital audio signals h1 to h32 is selected, h1 for example, an audio expander 25 expands the selected digital audio signal h1 into an analog audio signal q1. Similarly, when the other digital signals h2 to h32 are selected by the demultiplexer 23, the expander 25 converts them into analog audio signals q2 to q32. Such analog signals q2 to q32 are supplied to, for example, a headphone 29A which produces sound. The other receivers 18B and 18C perform operations similar to the above. It is accordingly possible to provide video images or the sounds of selected channel through liquid crystal monitors 28B and 28C and headphones 29B and 29C for the seats 16B and 16C. In addition, the other data controllers 15B and 15C performs functions similar to the above, and it is accordingly possible to provide video images or sounds which can be selected from any seat in the aircraft. More data controllers can be easily built without any modification of the other circuits as long as the quality of the RF signals is maintained.

Thus, this AV signal providing apparatus 1 enables a digital signal to be compatible with an analog signal by limiting the transmission bandwidth to 6 MHz for each of the different media (in the above embodiment, the digital video signal, the analog video signal, and digital audio signal). It is accordingly possible to increase the number of channels easily without any modification of the circuit. In the digital video signal providers 10A, 10B, and so on, the video signals compressed by the MPEG are recorded on the disc 30A, 30B, and so on. By changing the compression rate, it is possible to change the number of the channels for video images without changing the coaxial cable 14. Since the digital signals a1 to a4 are compressed to 1.5 Mbps, this embodiment can provide four times (=6 Mbps/1.5 Mbps) the number of channels. Although the above embodiment has digital video signal providers 10A to 10T, an analog video signal provider 11, and a digital audio signal provider 12, any combination of these, based on budget or circumstances, is possible. By using a coaxial cable for which the transmission bandwidth is larger, it is possible to provide additional channels.

As described above, in the present invention, a number of video signals, which are digitally compressed are multiplexed by time-division and modulated into modulation frequencies forming a modulated signal with a bandwidth of 6 MHz, which is equal to a carrier frequency for a TV channel. According to the present invention, it is possible to install more channels, in accordance with the multiple corresponding to the digital compression rate, than the case in which only RF-modulated analog video signal is transmitted, without any modification of the circuit. It is also possible to have a digital video signal compatible with an analog video signal. When a video image is transmitted through a TV camera in real time, no compression process is needed, and its structure may be simple. In addition, it is possible to transmit a high-quality audio signal in the signal providing operation.

It will be obvious to those having skill in the art that many changes may be made in the above-described details of the preferred embodiment of the present invention. The scope of the present invention, therefore, should be determined by the following claims.

What is claimed is:

1. A signal providing apparatus comprising:
   analog video signal providing means for providing an RF-modulated analog video signal having a bandwidth;
   at least one digital video signal providing means providing an RF-modulated digital video signal having a bandwidth comprising:
      time-division multiplexing means for multiplexing a plurality of compressed digital video signals by time division, and
      RF-modulating means for modulating a carrier signal with an output signal from the time-division multiplexing means, wherein a bandwidth of the carrier signal used by said RF-modulating means is equal to the bandwidth of the RF-modulated analog video signal; and
   frequency-division multiplexing means for multiplexing by frequency-division the RF-modulated analog video signal from the analog video signal providing means and the RF-modulated digital video signal or signals from the at least one digital video signal providing means.

2. A signal providing apparatus according to claim 1, wherein the bandwidth of the RF-modulated analog and digital video signals is equal to a bandwidth of one-channel-television-signals.

3. A signal providing apparatus according to claim 1, wherein the bandwidth of the RF-modulated analog and digital video signals is 6 MHz.

4. A signal providing apparatus according to claim 1, further comprising audio signal providing means.

5. A signal providing apparatus according to claim 4 wherein said audio signal providing means comprise:
   audio signal time-division multiplexing means for multiplexing a plurality of audio signals by time-division; and
   audio signal modulating means for RF-modulating a carrier signal with the multiplexed audio signals, wherein a bandwidth of said carrier signal is equal to the bandwidth of the RF-modulated analog video signal;
   wherein the frequency-division multiplexing means multiplex the RF-modulated analog and digital video signals and the RF-modulated audio signals.

6. A method for providing signals comprising the steps of:
   providing an RF-modulated analog video signal having a bandwidth;
   providing at least one RF-modulated digital video signal having a bandwidth comprising the steps of;
      time-division multiplexing a plurality of compressed digital video signals by time division, and
      RF-modulating a carrier signal with an output signal from the time-division multiplexing step, wherein a bandwidth of the carrier signal used in said RF-modulation is equal to the bandwidth of the RF-modulated analog video signal; and
   frequency-division multiplexing by frequency-division the RF-modulated analog video signal and the RF-modulated digital video signal or signals.

7. A signal providing method according to claim 6, wherein the bandwidth of the RF-modulated analog and digital video signals is equal to a bandwidth of one-channel-television-signals.

8. A signal providing method according to claim 6, the bandwidth of the RF-modulated analog and digital video signals is 6 MHz.

9. A signal providing method according to claim 6, further comprising the step of providing at least one audio signal.

10. A signal providing method according to claim 9 wherein said step of providing at least one audio signal further comprises:
    time-division multiplexing a plurality of audio signals by time-division; and
    RF-modulating a carrier signal with the multiplexed audio signals, wherein a bandwidth of said carrier signal is equal to the bandwidth of the RF-modulated analog video signal;
    wherein said step of frequency-division multiplexing includes multiplexing the RF-modulated analog and digital video signals and the RF-modulated audio signals.

11. A signal providing system comprising:
    analog video signal providing means for providing an RF-modulated analog video signal having a bandwidth;
    at least one digital video signal providing means for providing an RF-modulated digital video signal having a bandwidth comprising:
       video time-division multiplexing means for multiplexing a plurality of compressed digital video signals by time division, and
       RF-modulating means for modulating a carrier signal with an output signal from the time-division multiplexing means, wherein a bandwidth of the carrier signal used by said RF-modulating means is equal to the bandwidth of the RF-modulated analog video signal;
    frequency-division multiplexing means for multiplexing by frequency-division the RF-modulated analog video signal from the analog video signal providing means and the RF-modulated digital video signal or signals from the at least one digital video signal providing means;
    video tuner means for receiving and demodulating a signal output by said frequency-division multiplexing means and for selecting a signal having a specific frequency;
    video selecting means for selecting from a signal output by said video tuner means one of said compressed digital video signals multiplexed by said video time-division multiplexing means or said analog video signal;
    video expanding means for expanding said signal selected by said video selecting means; and
    display means for receiving and displaying a signal expanded by said video expanding means.

12. A signal providing system according to claim 11, wherein the bandwidth of the RF-modulated analog and digital video signals is equal to a bandwidth of one-channel-television-signals.

13. A signal providing system according to claim 11, the bandwidth of the RF-modulated analog and digital video signals is 6 MHz.

14. A signal providing system according to claim 11, further comprising audio signal providing means.

15. A signal providing system according to claim 14 wherein said audio signal providing means comprise:

audio signal time-division multiplexing means for multiplexing a plurality of audio signals by time-division; and audio signal modulating means for RF-modulating a carrier signal with the multiplexed audio signals, wherein a bandwidth of said carrier signal is equal to the bandwidth of the RF-modulated analog video signal;

wherein the frequency-division multiplexing means multiplex the RF-modulated analog and digital video signals and the RF-modulated audio signals.

16. A signal providing system according to claim 15, further comprising:

audio tuner means for receiving and demodulating an audio signal output by said frequency-division multiplexing means and for selecting a signal having a specific frequency audio selecting means for selecting from a signal output by said audio tuner means one of said compressed audio signals multiplexed by said audio signal time-division multiplexing means;

audio expanding means for expanding said signal selected by said audio selecting means; and means for receiving a signal expanded by said audio expanding means and producing sound therefrom.

* * * * *